United States Patent
Yokoyama et al.

(10) Patent No.: US 7,227,689 B2
(45) Date of Patent: Jun. 5, 2007

(54) BIREFRINGENCE OPTICAL ELEMENT AND MANUFACTURING METHOD THEREOF

(75) Inventors: Mitsuru Yokoyama, Takatsuki (JP); Naoki Nishida, Kusatsu (JP)

(73) Assignee: Konica Minolta Holdings, Inc., Tokyo (JP)

(*) Notice: Subject to any disclaimer, the term of this patent is extended or adjusted under 35 U.S.C. 154(b) by 15 days.

(21) Appl. No.: 10/901,633

(22) Filed: Jul. 29, 2004

(65) Prior Publication Data
US 2005/0231802 A1  Oct. 20, 2005

(30) Foreign Application Priority Data
Apr. 19, 2004  (JP) ............... 2004-122649

(51) Int. Cl.
*G02B 5/18*  (2006.01)
(52) U.S. Cl. ............ 359/575; 359/566; 359/486; 359/494
(58) Field of Classification Search ............ None
See application file for complete search history.

(56) References Cited

U.S. PATENT DOCUMENTS

| | | | | |
|---|---|---|---|---|
| 4,712,881 A | * | 12/1987 | Shurtz et al. ............ 359/352 |
| 5,122,903 A | * | 6/1992 | Aoyama et al. ............ 359/565 |
| 6,927,915 B2 | * | 8/2005 | Nakai ............ 359/569 |
| 2003/0164534 A1 | | 9/2003 | Urakami et al. ............ 257/627 |
| 2006/0061862 A1 | * | 3/2006 | Mi et al. ............ 359/486 |
| 2006/0215263 A1 | * | 9/2006 | Mi et al. ............ 359/486 |

FOREIGN PATENT DOCUMENTS

| | | |
|---|---|---|
| JP | 06-122510 | 6/1996 |
| JP | 2003-207636 | 7/2003 |

OTHER PUBLICATIONS

Figs. 10-13b of U.S. Appl. No. 10/901,633, filed Jul. 29, 2004.

* cited by examiner

*Primary Examiner*—Arnel Lavarias
(74) *Attorney, Agent, or Firm*—Brinks Hofer Gilson & Lione

(57) ABSTRACT

A mask with an opening pattern is placed on a substrate, and etching is carried out by use of anisotropy etching of crystal. The opening pattern of the mask is composed of broken lines, each of which is discontinued by discontinuing portions. By the etching, a birefringence optical element with a fine structure, in which trenches, each of which is discontinued by discontinuing portions, are juxtaposed periodically at a specified pitch, is obtained.

6 Claims, 8 Drawing Sheets

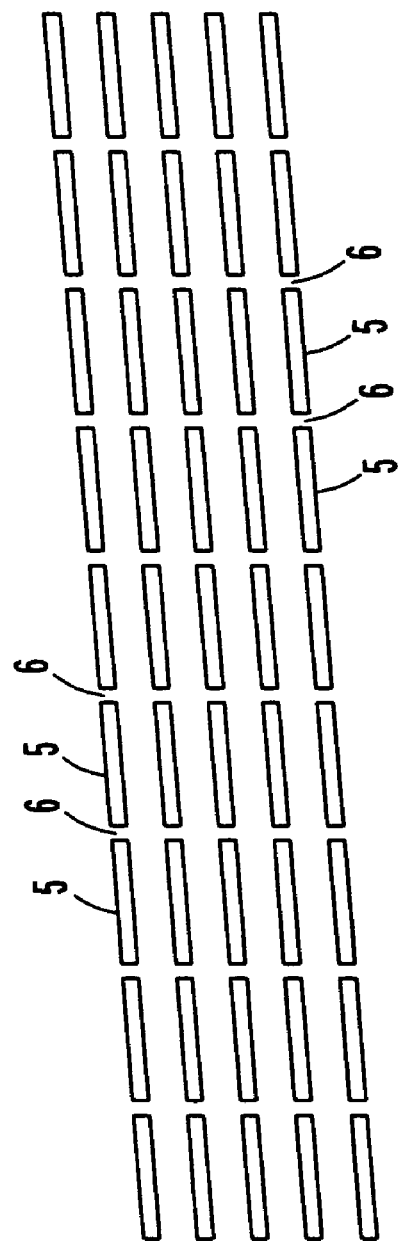
F I G. 1 a
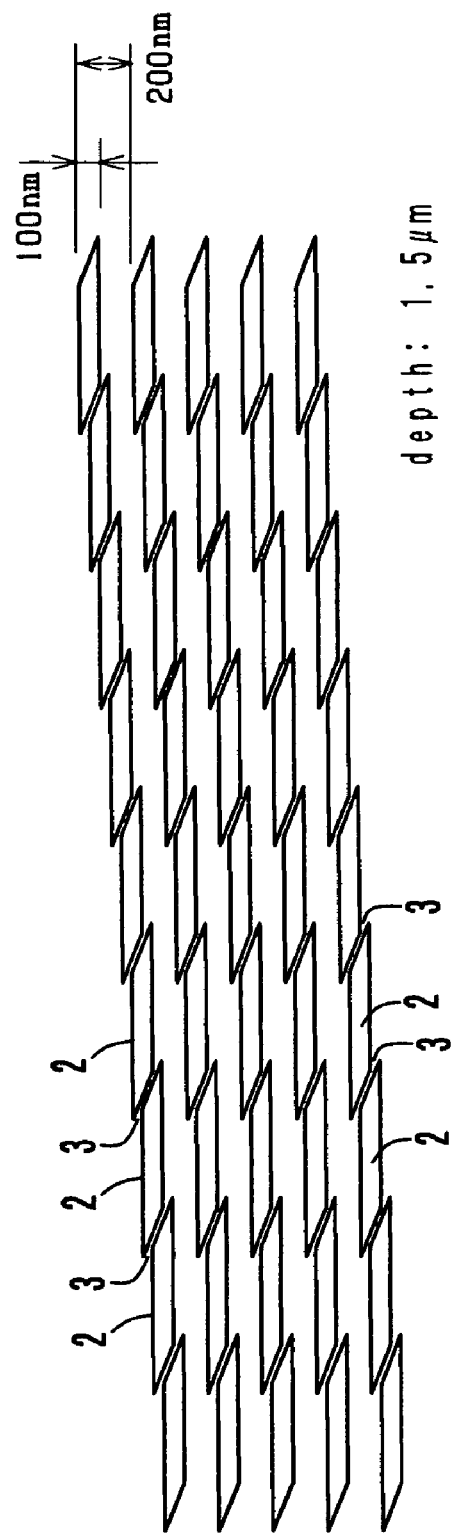
F I G. 1 b

F I G. 4a
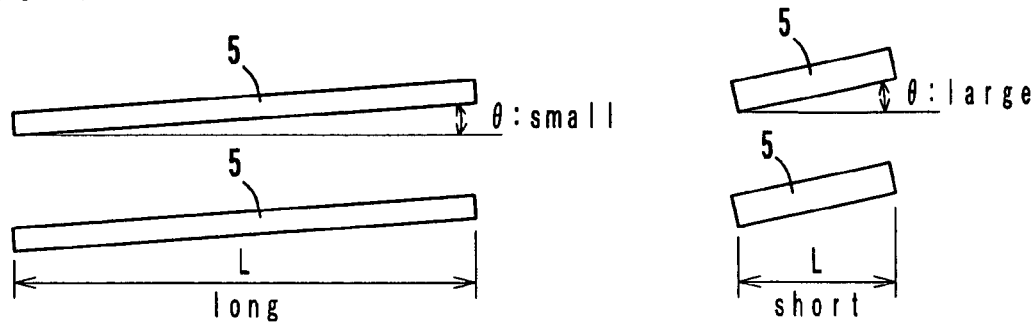
F I G. 4b
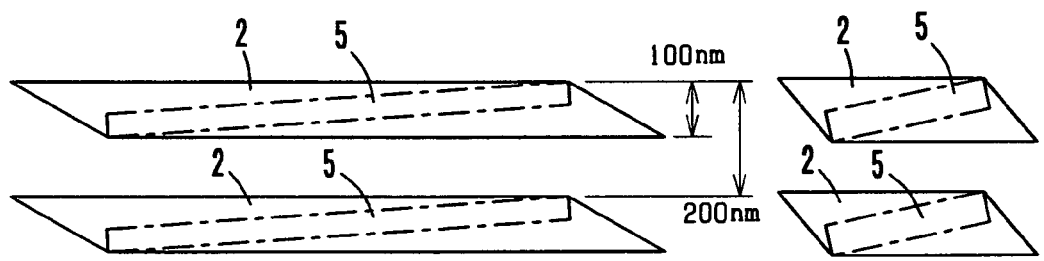
F I G. 5
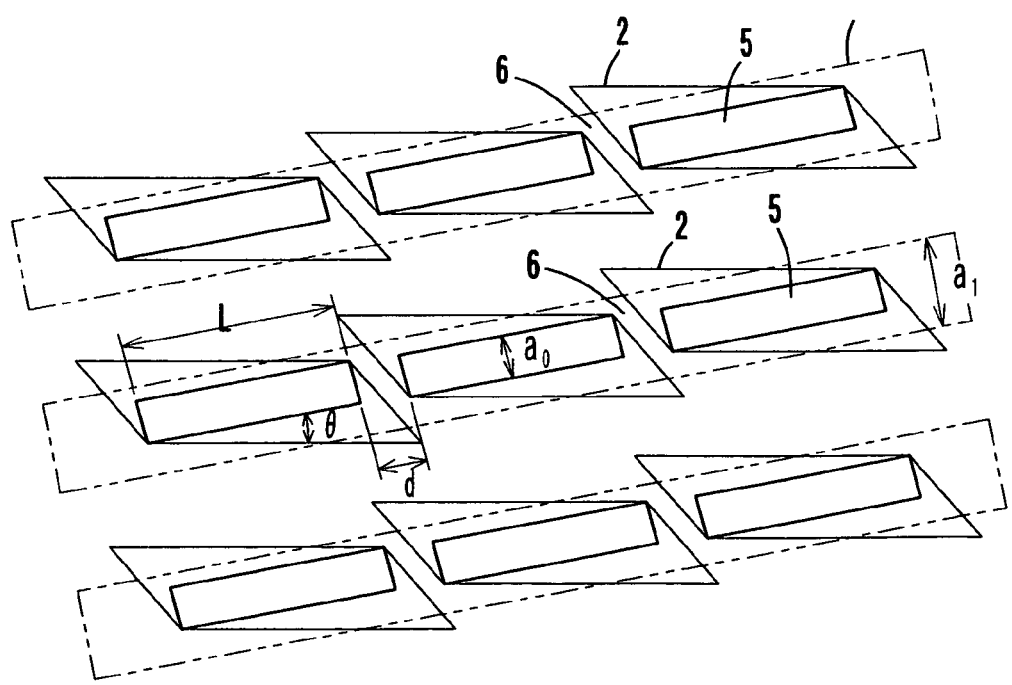

BIREFRINGENCE OPTICAL ELEMENT AND MANUFACTURING METHOD THEREOF

This application is based on Japanese application No. 2004-122649 filed on Apr. 19, 2004, the content of which is hereinafter incorporated by reference.

BACKGROUND OF THE INVENTION

1. Field of the Invention

The present invention relates to a birefringence optical element and more particularly to a birefringence optical element with a plurality of trenches arranged at a specified pitch to cause structured birefringence, and a manufacturing method thereof.

2. Description of Related Art

As shown in FIG. 10, when fine structures (trenches) 2 smaller than the wavelength of light L are arranged at a pitch smaller than the wavelength of the light L, the light L does not react to the respective fine structures but reacts to the average refractive index of the fine structures. An area in which this phenomenon appears is referred to as an equivalent refraction area. When fine structures in an equivalent refraction area are positioned to have orientation against an optical surface, the optical surface obtains strong optical anisotropy (polarization A and polarization B in FIG. 10). The optical anisotropy is referred to as structured birefringence.

Birefringence optical elements of this kind are produced conventionally by cutting natural crystal. Recently, however, as disclosed by US 2003/0164534 A1 and Japanese Patent Laid-Open Publication No. 2003-207636, it is suggested that the birefringence optical elements be manufactured from artificial materials.

As FIGS. 10, 11a and 11b show, an example of producing an optical element with structured birefringence is making trenches 2 in a semiconductor substrate 1 at a fine pitch p of about 200 nm at a duty factor of 1:1. The semiconductor substrate 1 with the fine structures formed thereon can be used as an optical element. Also, the semiconductor substrate 1 may be used as a matrix to be printed on a mold to manufacture optical elements by resin molding.

A known method of forming fine structures on a semiconductor substrate at a pitch p of about 200 nm is dry etching or wet etching the semiconductor substrate by use of a mask patterned by photolithography or ion beam lithography.

When an optical element using the birefringence characteristic generated by structured birefringence is used as a polarizer such as a retardation film, the optical element must cause a desired phase difference between longitudinal polarization and horizontal polarization, and light must be propagated within the birefringence medium until the desired phase difference can be obtained.

In a structured birefringence medium, the degree of the phase difference depends on the depth of the trenches. There are cases in which the depth of the trenches must be of several microns depending on the wavelength of light and the material of the medium. In order to make a full usage of the optical characteristics of the medium, the trenches must be formed with extremely high accuracy. For example, if a structural pattern is to be formed at a pitch of 200 nm and at a duty factor of 1:1, trenches with a width of 100 nm and a depth of several microns must be formed, which requires extremely accurate processing. It is difficult to form the trenches with such a depth by dry etching, and a possible way of forming the trenches is anisotropy etching of a semiconductor crystal.

As an example of forming a fine pattern by wet etching, there is a case of forming trenches on a (110) surface of a silicon substrate. Specifically, a mask is patterned such that the side walls of the trenches will be in parallel to a surface perpendicular to the (110) surface, for example, will be in parallel to a combination of mutually opposite surfaces (−111) and (1−1−1) or (1−11) and (−11−1), and wet etching is carried out by use of an alkali solvent such as potassium hydroxide, tetramethyl ammonium hydroxide, etc.

In this case, the etching speed in the (−111) direction and the etching speed in the (1−1−1) direction are lower than the etching speed in the (110) direction, and specifically the etching speeds in the (−111) direction and in the (1−1−1) direction are $1/100$ to $1/1000$ of the etching speed in the (110) direction. Therefore, it is possible to form good vertical trenches, which are narrow but very deep in the (110) direction.

However, in order to use such a fine structure as an optical element, the structure must have a larger optical area than a bundle of rays (of which diameter is ordinarily, at the minimum, several tens of microns and at the maximum, several centimeters, and may be larger depending on the usage), and very long and narrow trenches must be formed.

In order to form very long trenches, the direction of the mask pattern must be set in a desired direction of the crystal with extremely high accuracy. FIG. 12a shows an opening pattern 5 of a mask, and FIG. 12b shows trenches formed by etching by use of the mask of FIG. 12a. As FIGS. 13a and 13b show, if the mask is placed with the opening pattern 5 displaced from the direction of the crystal even a little (at a displacing angle θ), etching will proceed to reach the (1−11) surface and the (−11−1) surface. Consequently, the widths of the trenches become large, and moreover, adjacent trenches may communicate with each other. In this case, a desired fine periodical structure cannot be obtained.

For example, if the lengths of the trenches 1 mm and if the distance between adjacent trenches is 100 nm, from simple calculation not considering the widths of the trenches (see the expression below), displacement of $6 \times 10^{-3}$ degrees will result in connection between adjacent trenches.

$$\begin{aligned}
\theta &= \tan^{-1}(100 \text{ nm}/1 \text{ mm}) \\
&= \tan^{-1}(100 \times 10^{-9}/1 \times 10^{-3}) \\
&\approx (100 \times 10^{-9}/1 \times 10^{-3}) \text{rad} \\
&= 1 \times 10^{-4} \text{rad} \\
&= 6 \times 10^{-3} \text{ degrees}
\end{aligned}$$

For accurate direction/axis setting, usually, an orientation flat 1a (see FIG. 11a) which is attached to a substrate to indicate the directions of the crystal is used. Even by using the orientation flat 1a, however, it is extremely difficult to set the direction of trenches accurately in the direction of the crystal.

SUMMARY OF THE INVENTION

An object of the present invention is to provide a birefringence optical element with a fine periodical structure, in which adjacent trenches are not connected to each other.

Another object of the present invention is to provide a method for producing a birefringence optical element with a fine periodical structure, in which adjacent trenches are not connected to each other.

In order to attain the objects, a birefringence optical element according to the present invention comprises a plurality of trenches which are arranged periodically at a specified pitch so as to cause structured birefringence, and each of the trenches is broken into parts like a broken line by being discontinued by discontinuing portions or is discontinued by at least one discontinuing portion.

According to the present invention, in expectation of displacement between the direction of crystal of a substrate and the direction of trenches formed thereon, each trench is formed of linearly arranged short and narrow parts separated by discontinuing portions. Since each trench is composed of short parts, there is no fear that adjacent trenches may be connected to each other, and a birefringence optical element with a fine periodical structure can be obtained. The separated parts of each trench are not necessarily arranged exactly linearly. However, the arrangement is finer than the wavelength of light, and therefore, light does not react to the discontinuing portions of the trenches and reacts to the average refractive index.

In the birefringence optical element according to the present invention, the discontinuing portions of the trenches may be positioned regularly or irregularly in the periodical direction of the trenches. Also, the parts of each trench may tilt at a specified angle to the extending direction of the trench.

The birefringence optical element according to the present invention can be produced by using a mask with an opening pattern composed of broken lines, each of which is discontinued by discontinuing portions or by using a mask with an opening pattern composed of lines, each of which is discontinued by at least one discontinuing portion. In etching a substrate, this mask is placed on the substrate.

The etching is carried out by use of anisotropy etching of crystal, and wet etching is suited to form deep trenches. As the substrate, a semiconductor monocrystal is usable, and a silicon wafer is suited. Further, silicon with a (110) surface is the most suited.

BRIEF DESCRIPTION OF THE DRAWINGS

These and other objects and features of the present invention will be apparent from the following description with reference to the accompanying drawings, in which:

FIGS. 1a and 1b show an embodiment of a birefringence optical element according to the present invention, FIG. 1a being a plan view showing an opening pattern of a mask and FIG. 1b being a plan view showing trenches formed on a substrate;

FIGS. 4a and 4b show the angle of displacement θ between the direction of the opening pattern and the direction of crystal of the substrate and the possible length L of broken parts of the trenches, FIG. 4a being a plan view of the opening pattern of the mask and FIG. 4b showing a plan view of the broken parts of the trenches;

FIG. 5 is an illustration showing the relationship between the opening pattern of the mask and the trenches;

FIGS. 7a and 7b show trenches which were formed in the experiment, FIG. 7a being a plan view and FIG. 7b being a chart showing a section taken along a line A—A in FIG. 7a;

FIGS. 9a and 9b show trenches which were formed in the experiment shown in FIG. 8, FIG. 9a being a plan view and FIG. 9b being a chart showing a section taken along a line A—A in FIG. 9a;

DETAILED DESCRIPTION OF THE PREFERRED EMBODIMENTS

Embodiments of a birefringence optical element and a method for producing a birefringence optical element are described with reference to the accompanying drawings.

A birefringence optical element according to the present invention (for example, a polarizer used as a retardation film) is produced by etching a substrate with a mask with an opening pattern 5 shown by FIG. 1a covered on the substrate. The opening pattern 5 of the mask is composed of broken lines, each of which is discontinued by discontinuing portions 6. Accordingly, as FIG. 1b shows, a fine structure composed of periodically juxtaposed trenches 2, each of which is like a broken line discontinued by discontinuing portions 3, is obtained. The patterning of the mask is carried out by photolithography or ion beam lithography.

Figure 2A:
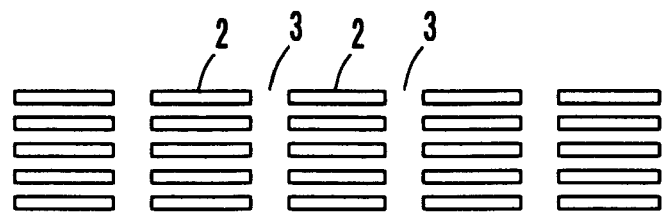
FIGS. 2a, 2b and 2c are plan views showing various kinds of arrangement of trenches for birefringence optical elements according to the present invention.
Figure 2B:
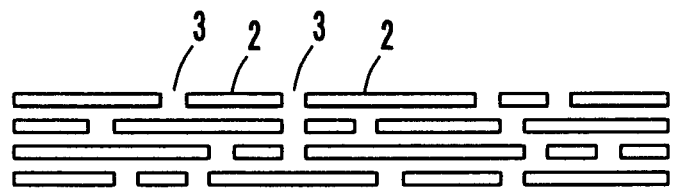
Figure 2C:
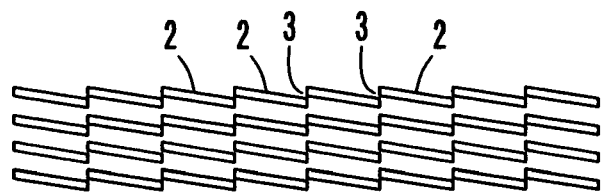

In the birefringence optical element according to the present invention, the discontinuing portions 3 of the trenches 2 may be positioned regularly (see FIG. 2a) or irregularly (see FIG. 2b) in the periodical direction of the trenches 2. Also, each of the trenches 2 may be separated by the discontinuing portions 3 into tilting parts which tilt at a specified angle to the extending direction of the trenches 2 (see FIG. 2c). Each of the trenches 2 merely needs to have at least one discontinuing portion 3.

In producing the birefringence optical element, a mask used for transfer of the trenches 2 has an opening pattern 5 composed of lines, each of which is separated into parts by discontinuing portions 6, or has an opening pattern 5 composed of lines, each of which is discontinued by at least one discontinuing portion 6. The trenches 2 formed by transfer may be or may not be like broken lines. What is important is that the trenches 2 are juxtaposed at a pitch smaller than the wavelength of light without being connected to each other.

Figure 3:
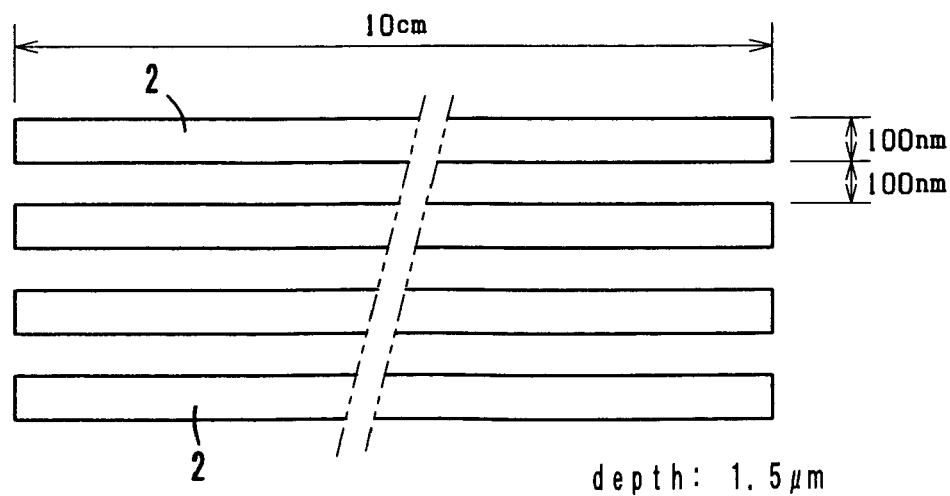
FIG. 3 is an illustration showing dimensions and arrangement of trenches.

Now, an example of forming broken-linear trenches 2 on a silicon substrate is described. As FIG. 3 shows, a case of forming trenches 2 with a width of 100 nm and a length of 10 cm at a pitch of 200 nm is described.

A mask with an opening pattern 5 composed of broken lines shown by FIG. 1a is produced, in expectation of a little displacement between the crystal direction of the silicon substrate and the direction of the trenches 2. In this stage, the followings are important:

1) estimating the degree of possible displacement; (When positioning of the mask on a substrate is carried out by use of an orientation flat, displacement of approximately 10 minutes possibly occurs.)
2) considering to what extent the broken-linear openings 5 of the mask can be formed narrow; (If the openings 5 can be formed extremely narrow, displacement in some degree may be tolerated; according to the present mask-producing technique, however, approximately 50 nm is the limit.)
3) setting the length of the broken parts of the broken lines; and
4) setting the length of the discontinuing portions 6. (If the discontinuing portions 6 are too long, it will be too remarkable that the formed trenches are like broken lines, and if the discontinuing portions 6 are too short, the optical effect will be small.)

Theoretically, as FIGS. 4a and 4b show, when the angle of displacement θ is large, the broken parts must be short, and the length L of the broken parts is determined mostly from the width of the openings 5 (initial width) and the width of the formed trenches 2 (finished width).

When the pitch of the periodical structure is p, the initial width is $a_0$, the finished width is $a_1$, and the angle of displacement from the direction of crystal is θ(rad), if θ is sufficiently small, the length of each of the broken parts must be set to be not more than a smaller value of the values L1 and L2 calculated by the following expressions:

$$L1=(a_1-a_0)/\theta$$

$$L2=(p-a_0)/(2\theta)$$

For example, when p=200 nm, $a_0$=50 nm, $a_1$=100 nm and θ=10/60×π/180(rad)=10 minutes, $$L1=(100-50)/(10/60\times\pi/180)=17189 \text{ (nm)}=17 \text{ μm};$$
and
$$L2=(200-50)/(10/60\times2\pi/180)=25783 \text{ (nm)}=26 \text{ μm}.$$

Therefore, the smaller value L1 is adopted, and the length of each of the broken parts is set to 17 μm or less.

On the other hand, as FIG. 5 shows, the length d of the discontinuing portions 6 should be generally larger than the initial width $a_0$.

Figure 6:
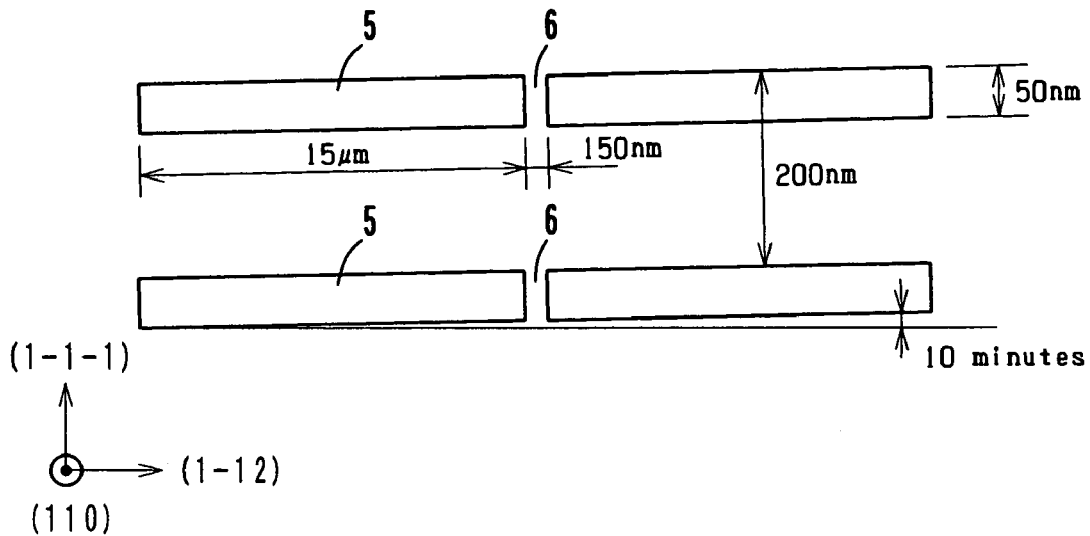
FIG. 6 is an illustration of an opening pattern of a mask which was used for an experiment.
Figure 7A:
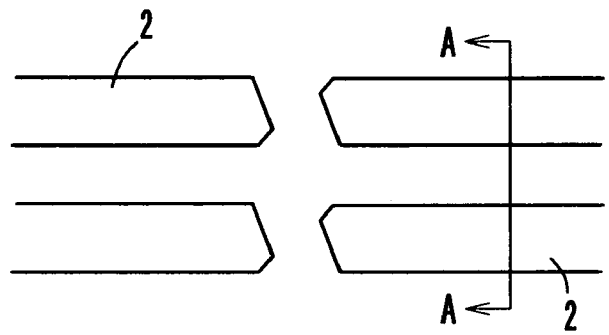
Figure 7B:
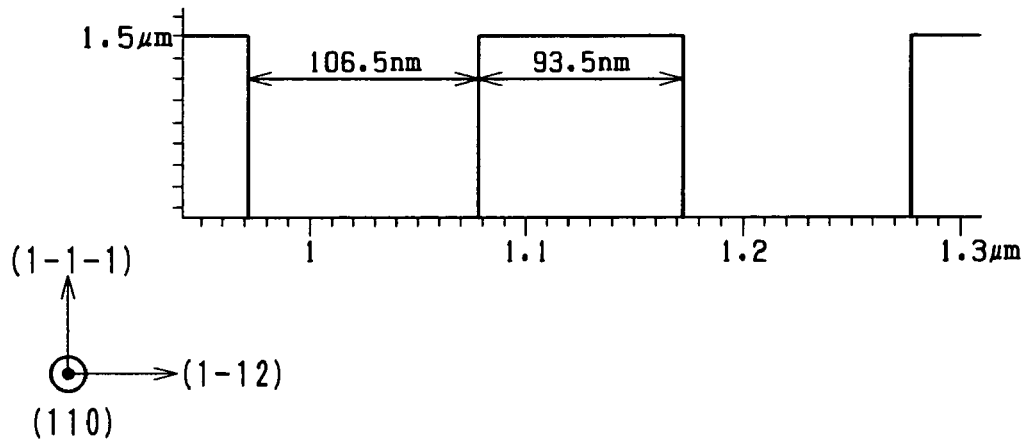

The present inventors conducted an experiment by use of a mask with an opening pattern 5 shown by FIG. 6. The opening pattern 5 of the mask is composed of broken lines which are juxtaposed at a pitch of 200 nm, and each of the broken lines is separated into broken parts with a length of 15 μm and a width of 50 nm (initial width) by discontinuing portions 6 with a length of 150 nm. This mask was placed on a substrate with displacement of 10 minutes between the direction of the opening pattern 5 and the crystal axis of the substrate. Then, etching to a depth of 1.5 μm was carried out by use of KOH with a temperature of 40° C. and a concentration of 30%. As a result, trenches 2 shown by FIGS. 7a and 7b were formed. The trenches 2 were formed very vertically, and there were no connecting portions between the trenches 2.

In the experiment, the length d of the discontinuing portions 6 was 150 nm, which is three times the initial width $a_0$, and after the etching, portions with a length of approximately 90 nm were left unetched as discontinuing portions 3. The discontinuing portions 3 with a length of this degree do not influence the optical characteristics.

Figure 8:
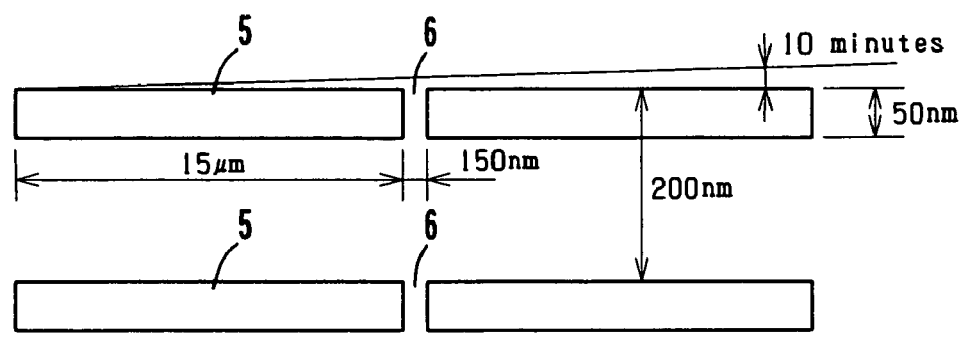
FIG. 8 is an illustration showing another experiment which was conducted by use of the mask shown in FIG. 6.
Figure 8:
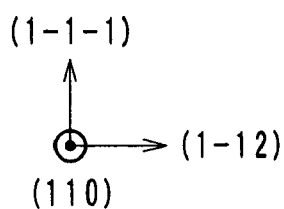
Figure 9A:
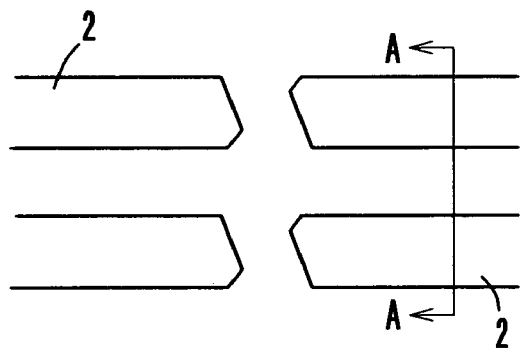
Figure 9B:
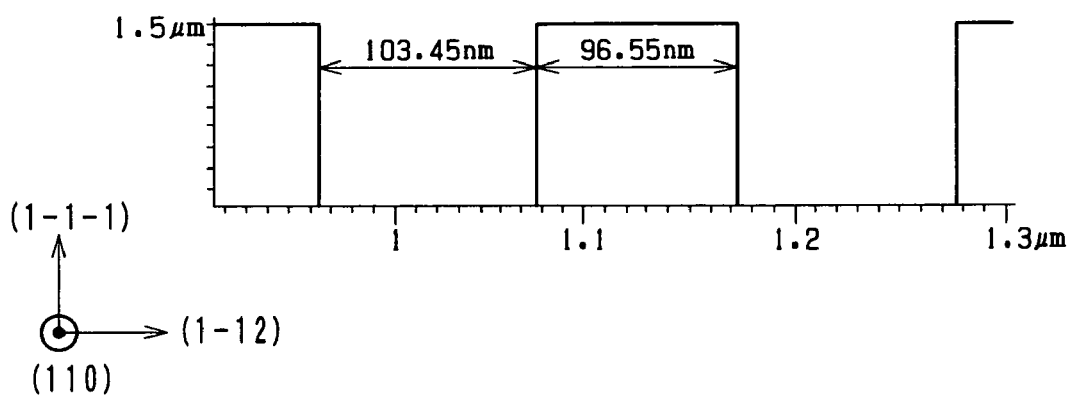
Figure 10:
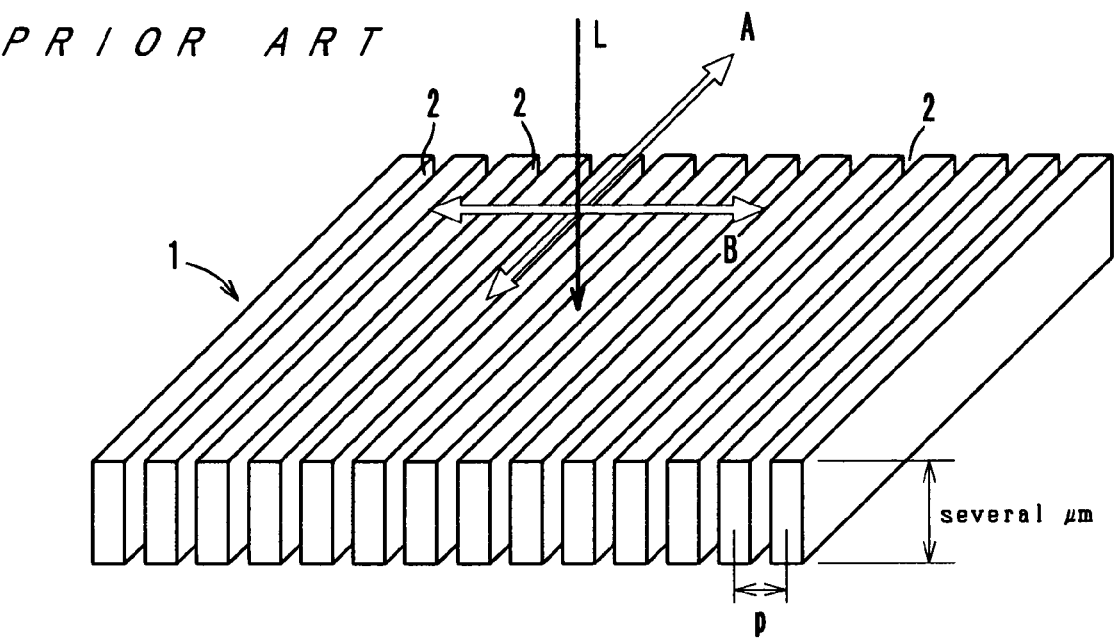
FIG. 10 is a perspective schematic view showing a trench structure of a conventional birefringence optical element.
Figure 11A:
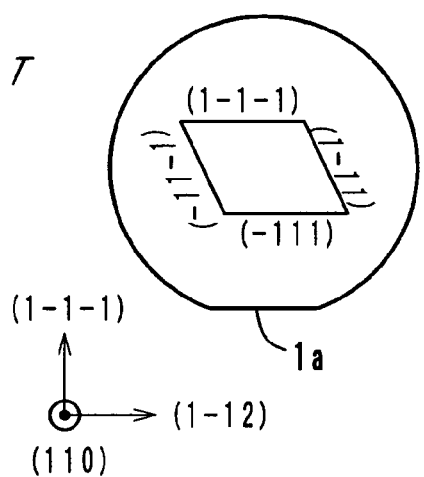
FIGS. 11a and 11b show a conventional trench structure, FIG. 11a being an illustration of a substrate and FIG. 11b being a perspective view of the substrate.
Figure 11B:
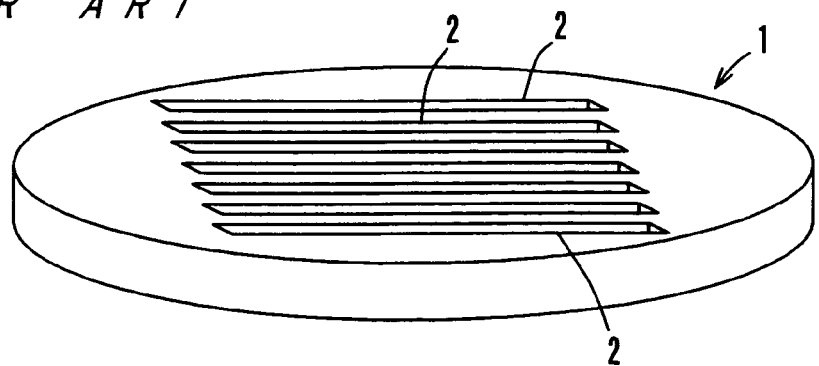
Figure 12A:
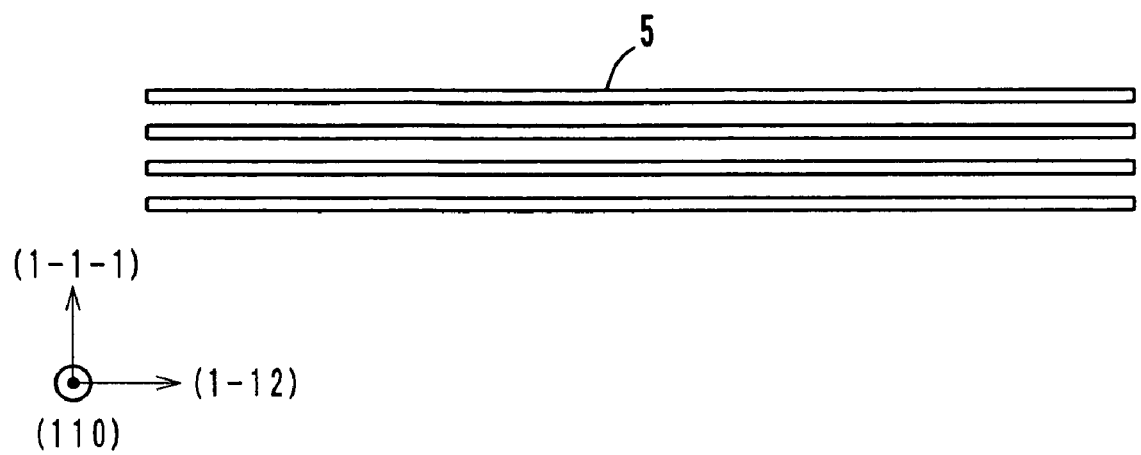
FIGS. 12a and 12b show a conventional manufacturing process of the trench structure, FIG. 12a being a plan view of an opening pattern of a mask and FIG. 12b being a plan view of formed trenches.
Figure 12B:
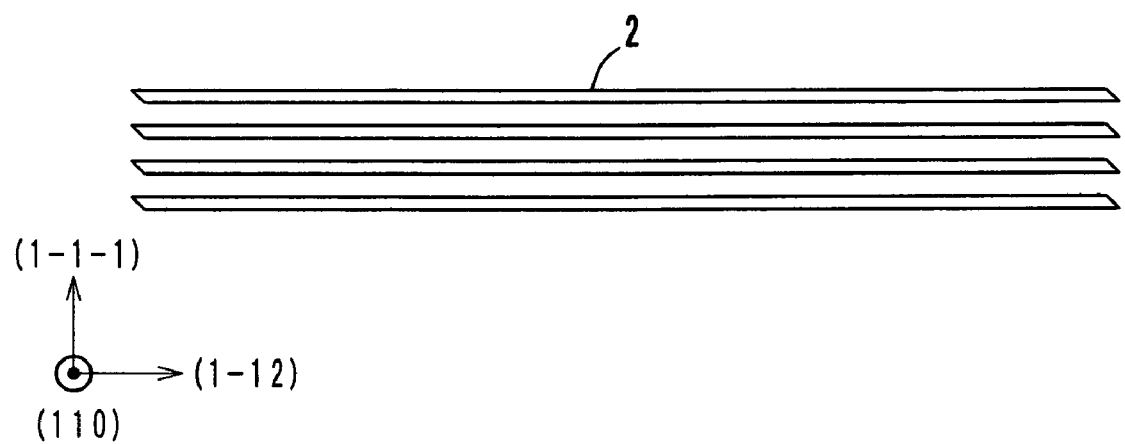
Figure 13A:
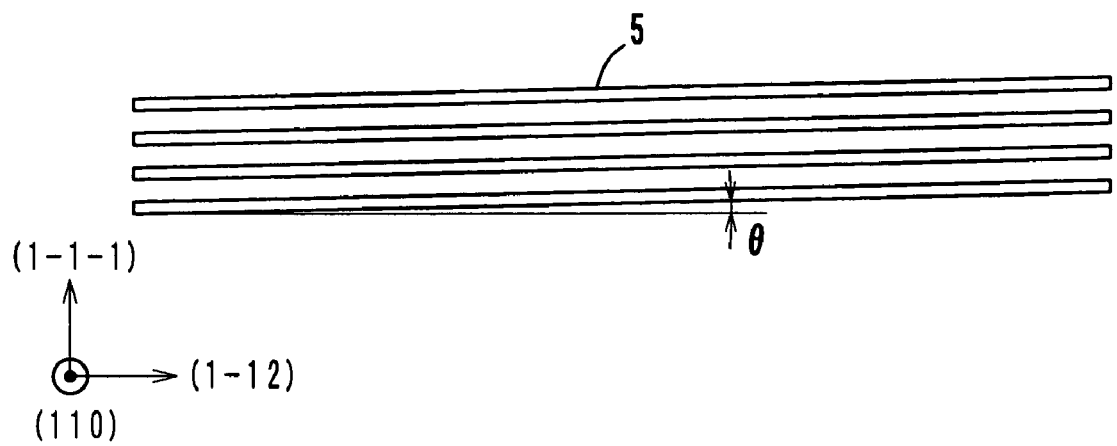
FIGS. 13a and 13b show a conventional manufacturing process of the trench structure, FIG. 13a being a plan view of an opening pattern of a mask and FIG. 13b being a plan view of formed trenches.
Figure 13B:
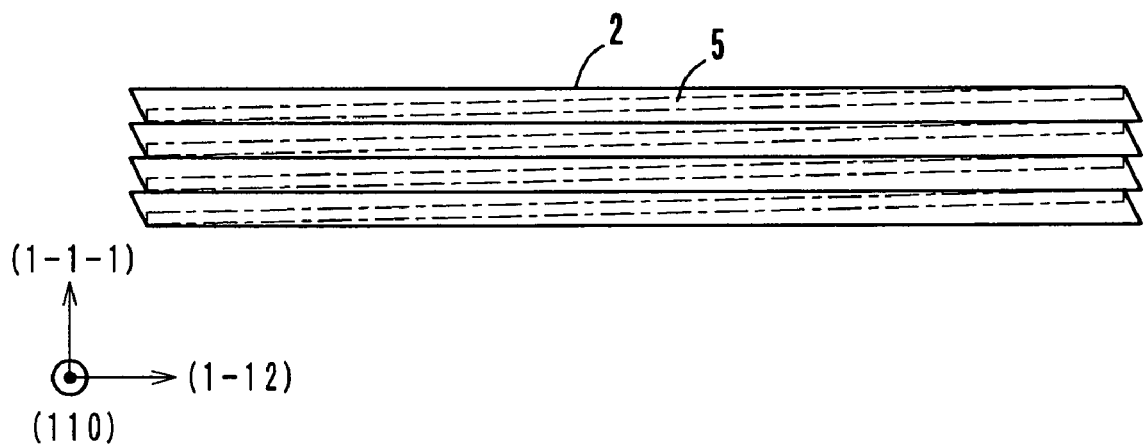

Also, when the same etching was carried out with the same mask placed to cause displacement of the same degree in the opposite direction (see FIG. 8), good trenches 2 were formed as shown by FIGS. 9a and 9b.

As is apparent from the above experiments, by using the mask with the opening pattern composed of broken lines, displacement θ of ±10 minutes can be effectively compensated.

A birefringence optical element according to the present invention and a manufacturing method thereof are not limited to the above-described embodiment. The substrate is not necessarily silicon. The dimensions of the opening pattern of the mask and the dimensions of the trenches are merely examples.

Although the present invention has been described in connection with the preferred embodiment, it is to be noted that various changes and modifications are possible to those who are skilled in the art. Such changes and modifications are to be understood as being within the scope of the present invention.

What is claimed is:

1. A birefringence optical element comprising:
a plurality of trenches which are juxtaposed periodically at a specified pitch so as to cause structured birefringence,
wherein each of the trenches is broken into parts by being discontinued by at least one discontinuing portion,
wherein the discontinuing portions of the trenches are arranged irregularly in the periodical direction of the trenches, wherein at least one of the trenches has a broken pattern different from those of the other trenches.

2. A birefringence optical element according to claim 1, wherein the broken parts of each of the trenches are formed diagonally with respect to the extending direction of the trench.

3. A birefringence optical element according to claim 1, wherein each part of the trenches is a parallelogram whose internal angles are not 90 degrees.

4. A birefringence optical element according to claim 1, wherein said trenches are formed on a surface of a semiconductor substrate.

5. A birefringence optical element according to claim 1, wherein said plurality of trenches are formed on a (110) surface of a substrate composed of a monocrystal material, wherein the trenches are formed as recesses in the monocrystal material of the substrate.

6. A birefringence optical element according to claim 1, wherein the pitch at which the trenches are juxtaposed is smaller than a wavelength of an incident light so that an equivalent refraction area is formed and an optical surface obtains optical anisotropy, and
wherein the broken parts of each trench are arranged at a second fixed pitch in an extending direction of the trench.

* * * * *